Figure 3:
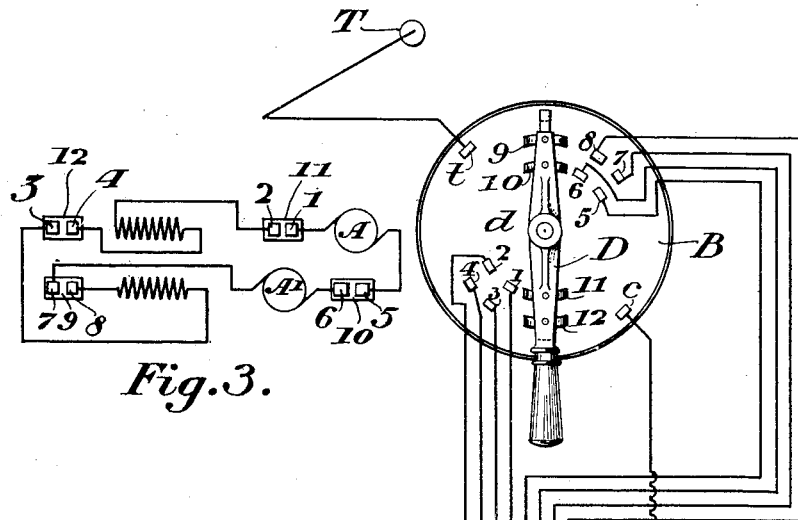

No. 661,491. Patented Nov. 13, 1900.
W. M. BROWN.
EMERGENCY BRAKE SWITCH.
(Application filed Oct. 14, 1898.)
(No Model.)

WITNESSES:
Robert M. Evans
Myrtle E. Sharpe

INVENTOR
W. Milt. Brown
BY
Richard Lyn
ATTORNEY.

UNITED STATES PATENT OFFICE.

WILLIAM MILT. BROWN, OF JOHNSTOWN, PENNSYLVANIA.

EMERGENCY-BRAKE SWITCH.

SPECIFICATION forming part of Letters Patent No. 661,491, dated November 13, 1900.

Application filed October 14, 1898. Serial No. 693,496. (No model.)

*To all whom it may concern:*

Be it known that I, WILLIAM MILTON BROWN, of Johnstown, in the county of Cambria and State of Pennsylvania, have invented a new and useful Improvement in Emergency-Brake Switches, of which the following is a full, clear, and exact description, reference being had to the accompanying drawings, which form a part of this specification.

My invention relates to the provision of a simple form of braking-switch adapted for use on electric-railway vehicles, and while my invention may be used in ordinary practice, if desired, to brake or aid in braking the car it is principally adapted for use as an emergency-brake.

Nearly all electric-railway vehicles are propelled by two electric motors which are sometimes placed in series relation with each other and sometimes in parallel relation with each other, a series-multiple controller being provided to effect these changes. It is well known that with such an arrangement of motors it is quite possible to use them to brake the car in an emergency without utilizing the trolley-current and without using any other switches than those ordinarily provided for regulation. This has been done in the following manner: If for some reason the hand-brake fails, the motorman first opens the overhead canopy-switch, so as to cut out the connection from the source of electric supply, then throws his reversing-switch so as to arrange the coils of the motors so that they would naturally propel the car in a direction opposite to that in which they would normally tend to propel it, and would finally move his series-multiple switch so as to place the motors in a multiple position. The motors being rotated in one direction by the momentum of the car and being disconnected from the outside source of supply are generators tending to generate current in opposition to each other and, as is commonly known in the art, are "bucking" one another. Whichever motor proves the stronger tends to dominate the other motor. Hence one becomes a generator and tends to drive the other in a direction opposite to that in which the current is traveling. This will quickly slacken the speed of the car. My object is to produce the same results by the short movement of the handle of a single switch. Another method of braking the car with the apparatus at present provided consists in simply throwing the reversing-switch and then turning the regulating-switch without opening the circuit of the source of supply. This is simpler than the other method now practiced, in that it only provides two switch movements instead of three; but this is essentially faulty, in that the sudden rush of current from the outside of the motors tends to burn the fuse or the motors, for the motors are rotating in such a direction that their counter electromotive force instead of preventing a sudden flow of current only helps a large flow of current, as their coils are connected for rotation in one direction, while they are in reality rotating in another direction. The switching mechanisms usually employed for controlling car-motors at the present time require to effect this emergency-braking the manipulation of several parts, and as the demand for their use for this purpose is generally of a sudden and imperative nature (such as is caused by the acceleration of a car on a downgrade) it is of great importance that their construction should be of the most simple form and require only a minimum of intelligence and coolness on the part of the motorman. The switch which I have provided for this purpose consists, essentially, in the provision of fixed contacts connected to the terminals of the fields and armatures of the motors and movable contacts adapted to connect these fixed contacts, so as to connect the motors in a closed loop with the fields (or armatures) so connected that the current will flow through them in a reversed direction to that at which it would flow in the normal direction of rotation of the motors.

I have shown my invention as applied to that form of switch known in electric-railway practice as the "canopy-switch." This is, however, immaterial to my invention, as it might readily be applied as a separate switch or applied in the form of extra contacts on the reversing or regulating switch, the essence of the invention being only that the switch shall have one position in which the motors are connected together, as before described, and shall be so connected independent of the outside circuit.

Figure 2:
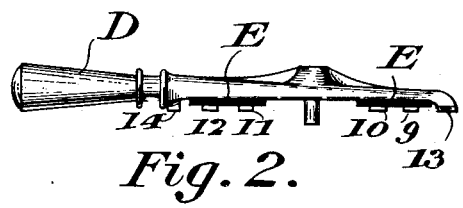
Figure 1:
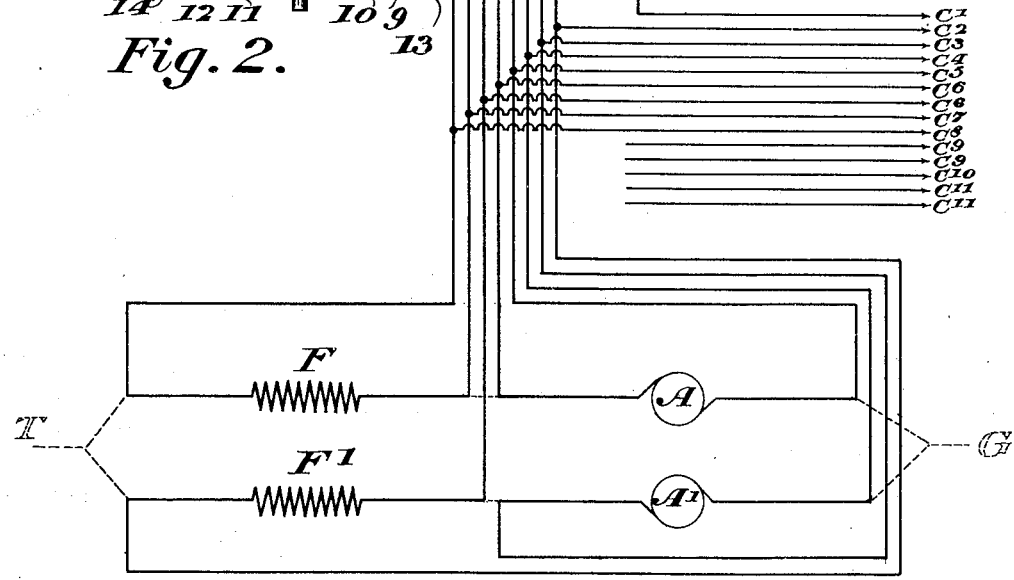

Referring to the drawings, Figure 1 shows a canopy-switch in which the extra contacts are provided to make the switch conform with my invention, and this figure also indicates in diagram the connection of the motors. Fig. 2 is a side view of the canopy-switch handle, and Fig. 3 shows the arrangement of the circuit when the switch is used as a brake.

A and A' represent the armatures of the two electric motors.

F and F' are the field-coils of corresponding motors.

T represents the connection of the trolley or source of electric supply, and C' C² C³, &c., represent conductors leading to the controller—viz., the regulating and reversing switches.

*t* is a terminal or contact connected with T, and *c* is a terminal connected with the controller by means of conductor C'. These terminals are suitably mounted on a base or in a vessel B and are adapted to be connected by a movable switch-handle D, which is rotatable around the pintle *d* and has contact portions 13 and 14, which are adapted to engage *t* and *c*, respectively, to connect the trolley with the controller. The other terminals of the switch are numbered 1 to 8, respectively, and are connected by conductors, as shown, with the motors in the following manner: Contact 1 with armature A, contact 2 with the opposite side of the field F, contacts 3 and 4 with corresponding sides of fields F and F', contacts 5 and 6, respectively, with the corresponding sides of armature A and armature A', and contacts 7 and 8 with opposite sides of armature A' and field F'. It will be seen, therefore, that these eight contacts form four pairs, that one of the pairs are connected to like sides of the different armatures, that another of the pairs are connected to like sides of different fields, and that each of the other two pairs connect unlike sides of the armature and field of one of the motors.

The switch-handle D is secured to a pair of insulators E, to which are secured bridging contact-pieces 9, 10, 11, and 12. These contact-pieces are adapted to bridge, respectively, contacts 7 and 8, contacts 5 and 6, contacts 1 and 2, and contacts 3 and 4. Provided the switch-handle D is thrown, so that bridging contacts 9, 10, 11, and 12 engage with contacts 1 to 8, the circuit is as follows, commencing, for example, at the left-hand side of armature A, from A to contact 1, through bridging contact 11 to contact 2, from 2 to the opposite side of field F, through F to contact 4, bridging contact 12 to contact 3, to field F', through F' to contact 8, bridging contact 9 to contact 7, to the opposite side of armature A', to contact 6, bridging contact 10, to contact 5 and armature A, closing the loop between the armatures independent of any outside circuit with the fields connected in their reverse manner. This is shown graphically in Fig. 3, and to illustrate that the fields are connected in a reverse direction to that at which they would normally be connected to rotate the car in a forward direction I have added to Fig. 1 certain dotted lines, which indicate the connections between the fields and armatures as they would be used to propel the car—that is, I have connected the right-hand side of field F with the left-hand side of armature A and a dotted line connects fields F' and A' in the same manner.

I have already fully set forth the essential features of my invention, and I do not consider that I am limited to any particular construction or arrangement of contacts to effect the essential characteristics of my invention, for the specific arrangement and combination could be modified without losing the essential features which enable me to provide an emergency-brake of this kind which is simple, effective, and reliable and can be operated by the movement of a single switch-handle.

In referring to reversing the field (or armature) connections from those suitable for propelling the car it is of course understood that this refers to cars as ordinarily controlled, in which the car is propelled from one or either end. If both ends are provided with controllers, both ends would naturally be provided with one of my switches, which would only vary from each other in the direction in which they would lead the current through the fields, (or armatures.) If the car is normally propelled for either direction of travel from one point, then it may be desirable to provide two sets of stationary contacts on my switch.

Having thus described my invention, what I claim, and desire to protect by Letters Patent, is—

1. The combination with a pair of electric motors, of a switch having a plurality of fixed contacts, arranged in pairs, one contact of one pair being connected to the supply-circuit and the other contact of the same pair to the regular motor-circuit, the remaining contacts being connected to the respective motor-terminals, said switch having a movable member which in one position connects the two contacts of the first-named pair, and in the second position disconnects said contacts and connects the other contacts in their respective pairs, the connections between these last-named contacts and the motor-terminals being such that when the switch is in the last-mentioned position the motors are connected in a closed circuit with one element of each connected to cause a current-flow therethrough in a direction reverse to the normal flow.

2. The combination with a pair of electric motors, of a switch having five pairs of fixed contacts, one contact of one pair being connected to the supply-circuit, and the other contact of the same pair to the regular motor-circuit, and each of the other contacts being connected respectively to one of the motor-terminals, of a movable arm or lever arranged in one position to bridge the two contacts of the first-named pair and also carrying four insulated contacts adapted each, in a second position of said arm or lever to bridge one pair of the other four pairs of contacts.

In testimony whereof I have affixed my signature in presence of two witnesses.

W. MILT. BROWN.

Witnesses:
MYRTLE E. SHARPE,
H. W. SMITH.